(12) United States Patent
Sun et al.

(10) Patent No.: US 8,503,767 B2
(45) Date of Patent: Aug. 6, 2013

(54) TEXTUAL ATTRIBUTE-BASED IMAGE CATEGORIZATION AND SEARCH

(75) Inventors: Jian Sun, Beijing (CN); Litian Tao, Beijing (CN); Lu Yuan, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 12/560,658

(22) Filed: Sep. 16, 2009

(65) Prior Publication Data

US 2011/0064301 A1    Mar. 17, 2011

(51) Int. Cl.
*G06K 9/62* (2006.01)
(52) U.S. Cl.
USPC .......................................................... 382/159
(58) Field of Classification Search
USPC .......................................................... 382/159
See application file for complete search history.

(56) References Cited

U.S. PATENT DOCUMENTS

| | | | | |
|---|---|---|---|---|
| 5,963,670 | A * | 10/1999 | Lipson et al. ................. | 382/224 |
| 6,072,889 | A * | 6/2000 | Deaett et al. ................. | 382/103 |
| 6,504,951 | B1 * | 1/2003 | Luo et al. ...................... | 382/165 |
| 7,478,091 | B2 * | 1/2009 | Mojsilovic et al. ................ | 1/1 |
| 2002/0122596 | A1 * | 9/2002 | Bradshaw ..................... | 382/226 |
| 2005/0147298 | A1 * | 7/2005 | Gallagher et al. ............ | 382/173 |
| 2006/0262976 | A1 * | 11/2006 | Hart et al. ..................... | 382/190 |
| 2007/0122034 | A1 * | 5/2007 | Maor ............................. | 382/181 |
| 2008/0002856 | A1 * | 1/2008 | Ma et al. ....................... | 382/103 |
| 2008/0037904 | A1 * | 2/2008 | Hiramoto et al. ............. | 382/306 |
| 2008/0069456 | A1 * | 3/2008 | Perronnin ..................... | 382/228 |
| 2008/0144068 | A1 * | 6/2008 | Digby ........................... | 358/1.13 |
| 2008/0240572 | A1 * | 10/2008 | Hoshii .......................... | 382/190 |
| 2009/0112830 | A1 * | 4/2009 | Denoue et al. .................... | 707/4 |
| 2010/0046849 | A1 * | 2/2010 | Wu et al. ....................... | 382/253 |
| 2010/0303342 | A1 * | 12/2010 | Berg et al. ..................... | 382/155 |
| 2010/0328452 | A1 * | 12/2010 | Jung et al. ..................... | 348/135 |
| 2011/0064301 | A1 * | 3/2011 | Sun et al. ...................... | 382/159 |
| 2011/0116711 | A1 * | 5/2011 | Wang et al. ................... | 382/165 |
| 2011/0142343 | A1 * | 6/2011 | Kim et al. ..................... | 382/173 |
| 2012/0076401 | A1 * | 3/2012 | Sanchez et al. ............... | 382/159 |
| 2012/0120097 | A1 * | 5/2012 | Sun et al. ...................... | 345/619 |

OTHER PUBLICATIONS

Jan C. Gemert et al., "Kernel Codebooks for Scene Categorization", 2008, Proceeding ECCV '08 Proceedings of the 10th European Conference on Computer Vision: Part III , pp. 696-709.*
Gabriella Csurka et al, "Visual Categorization with Bags of Keypoints", 2004, Workshop on Statistical Learning in Computer Vision, ECCV, p. 1-16.*
Litian Tao et al., "SkyFinder: Attribute-based Sky Image Search", Aug. 4, 2009, SIGGRAPH 2009, p. 1-5.*

(Continued)

*Primary Examiner* — Claire X Wang
*Assistant Examiner* — Gandhi Thirugnanam
(74) *Attorney, Agent, or Firm* — Lee & Hayes, PLLC

(57) ABSTRACT

Techniques and systems for providing textual attribute-based image categorization and search are disclosed herein. In some aspects, images may be analyzed to identify a category of an image, or portion thereof. Additional textual attributes may be identified and associated with the image. In various aspects, the categories may be types of sky sceneries. Categorized images may be searched based on the categories and/or attributes. In further aspects, a user interface may provide an intuitive arrangement of the images for user navigation and selection. The user interface may also provide a simplified presentation and search of the categorized images. Images selected from user interface may be used to replace or modify features of an existing target image.

20 Claims, 12 Drawing Sheets

OTHER PUBLICATIONS

James Hays et al., "Scene Completeion using Millions of Photographs", 2007, Computer Graphics Proceedings, Annual Conference Series, p. 1-7.*

Bitouk et al., "Face Swapping: Automatically Replacing Faces in Photographs", ACM Trans. on Graphics, also Proc of ACM SIGGRAPH, Aug. 2008, 8 pgs.

Boykov, et al., "Interactive Graph Cuts for Optimal Boundary & Region Segmentation of Objects in N-D Images", retrieved on Jul. 31, 2009 at http://www.csd.uwo.ca/~yuri/Papers/iccv01.pdf, Proceedings of Intl Conference on Computer Vision, vol. 1, Jul. 2001, pp. 105-112.

Csurka, et al., "Visual Categorization with Bags of Keypoints", retrieved on Jul. 31, 2009 at http://www.xrce.xerox.com/Publications/Attachments/2004-010/2004_010.pdf, Xerox, ECCV International Workshop on Statistical Learning in Computer Vision, May 2004, pp. 1-16.

Datta, et al., "Image Retrieval: Ideas, Influences, and Trends of the New Age", retrieved on Jul. 31, 2009 at http://infolab.stanford.edu/~wangz/project/imsearch/review/JOUR/datta.pdf, ACM Computing Surveys, vol. 40, No. 2, Article 5, May 2008, pp. 1-60.

Duda, et al., "10.13.1 Principal Component Analysis (PCA)", Pattern Classification, 2nd Edition, Chapt 10, 2001, pp. 568-569.

Hays, et al., "Scene Completion Using Millions of Photographs", retrieved on Jul. 31, 2009 at http://graphics.cs.cmu.edu/projects/scene-completion/, ACM Transactions on Graphics, SIGGRAPH 2007, Aug. 2007, vol. 26, No. 3, pp. 1-2.

Hoiem, et al., "Automatic Photo Pop-up", retrieved on Jul. 31, 2009 at http://www.cs.uiuc.edu/homes/dhoiem/publications/popup.pdf, Proceedings of ACM SIGGRAPH 2005, vol. 24, Issue 3, Jul. 2005, 8 pgs.

Jacobs, et al., "Fast Multiresolution Image Querying", retrieved on Jul. 31, 2009 at http://grail.cs.washington.edu/projects/query/, ACM, SIGGRAH, Aug. 1995, 5 pgs.

Jiang, et al., "Image Search by Latent Semantic Indexing based on Multiple Feature Fusion", retrieved on Jul. 31, 2009 at http://ieeexplore.ieee.org/stamp/stamp.jsp?tp=&arnumber=4566357&isnumber=4566248, IEEE Computer Society, Congress on Image and Signal Processing, Sep. 2008, pp. 515-519.

Ko, et al., "Region-based Image Retrieval Using Probabilistic Feature Relevance Learning", retrieved on Jul. 31, 2009 at http://cvpr.kmu.ac.kr/papers/international-papers/Probabilistic.pdf, Pattern Analysis & Applications, Springer-Verlag, London, Feb. 2001, pp. 174-184.

Kumar, et al., "FaceTracer: A Search Engine for Large Collections of Images with Faces", retrieved on Jul. 31, 2009 at http://www1.cs.columbia.edu/CAVE/publications/pdfs/Kumar_ECCV08.pdf, Springer-Verlag, ECCV Conference on Computer Vision, Oct. 2008, 14 pgs.

Lalonde, et al., "Photo Clip Art", retrieved on Jul. 31, 2009 at http://graphics.cs.cmu.edu/projects/photoclipart/, ACM Transactions on Graphics (SIGGRAPH), vol. 26, No. 3, Aug. 2007, pp. 1-4.

Li, et al., "Lazy Snapping", retrieved on Jul. 31, 2009 at http://research.microsoft.com/apps/pubs/default.aspx?id=69040, ACM, Proceedings of ACM SIGGRAPH 2004, Apr. 2004, pp. 303-308.

Lowe, "Distinctive Image Features from Scale-Invariant Keypoints", retrieved on Jul. 31, 2009 at http://www.cs.ubc.ca/~lowe/papers/ijcv04.pdf, Kluwer Academic Publishers, International Journal of Computer Vision, vol. 60, Issue 2, Jan. 2004, 28 pgs.

Lu, et al., "Joint Semantics and Feature Based Image Retrieval Using Relevance Feedback", retrieved on Jul. 31, 2009 at http://www.cs.cityu.edu.hk/~liuwy/publications/T-MM-01223561.pdf, IEEE Transaction on Multimedia, vol. 5, No. 3, Sep. 2003, pp. 339-347.

Matusik, et al., "Texture Design Using a Simplicial Complex of Morphable Textures", retrieved on Jul. 31, 2009 at http://graphics.ucsd.edu/~matthias/Papers/TextureDesign.pdf, ACM, SIGGRAPH 2005, Aug. 2005, 8 pgs.

Moosmann, et al., "Fast Discriminative Visual Codebooks using Randomized Clustering Forests", retrieved on Jul. 31, 2009 at http://hal.archives-ouvertes.fr/docs/00/20/37/34/PDF/MTJ-nips06.pdf, NIPS, Dec. 2006, pp. 1-7.

Nordbotten, "Image Retrieval", retrieved on Jul. 31, 2009 at http://nordbotten.com/ADM/ADM_book/ADM-ImageRetrieval.htm, Multimedia Information Retrieval System Book, Chap 9, Dec. 2008, 5 pgs.

Reinhard, et al., "Color Transfer Between Images", retrieved on Jul. 31, 2009 at http://ieeexplore.ieee.org/Xplore/login.jsp?url=http%3A%2F%Fieeexplore.ieee.org%2Fiel5%2F38%F20481%2F00946629.pdf&authDecision=-203, IEEE Computer Graphics and Applications, Applied Perception, vol. 21, No. 5, Sep./Oct. 2001, pp. 34-41.

Rubner, et al., "A Metric for Distributions with Applications to Image Databases", retrieved on Jul. 31, 2009 at http://www.cs.duke.edu/~tomasi/papers/rubner/rubnerIccv98.pdf, IEEE Computer Society, Proceedings of Intl Conference on Computer Vision, Jan. 1998, 8 pgs.

Smith, et al., "VisualSEEk: A Fully Automated Content Based Image Query System", retrieved on Jul. 31, 2009 at http://www.ee.columbia.edu/In/dvmm/publications/96/smith96f.pdf, ACM Multimedia 96, Nov. 1996, 12 pgs.

Snavely, et al., "Finding Paths through the World's Photos", retrieved on Jul. 31, 2009 at http://phototour.cs.washington.edu/findingpaths/, ACM Transactions on Graphics, SIGGRAPH 2008, vol. 27, No. 3, Aug. 2008, 2 pgs.

Snavely, et al., "Photo Tourism: Exploring Photo Collections in 3D", retrieved on Jul. 31, 2009 at http://phototour.cs.washington.edu/Photo_Tourism.pdf., ACM, SIGGRAPH 2006, Aug. 2006, 12 pgs.

Vapnik, "The Nature of Statistical Learning Theory", retrieved on Jul. 31, 2009 at http://cscs.umich.edu/~crshalizi/reviews/vapnik-nature/, Berlin, Springer-Verlag, 1995, The Bactra Review, May 1999, 2 pgs.

Zhang, et al., "iFind—A System for Semantics and Feature Based Image Retrieval over Internet", retrieved on Jul. 31, 2009 at http://reference.kfupm.edu.sa/content/i/f/ifind_a_system_for_semantics_and_feature_74780.pdf, ACM Multimedia 2000, Oct. 2000, 2 pgs.

* cited by examiner

TEXTUAL ATTRIBUTE-BASED IMAGE CATEGORIZATION AND SEARCH

BACKGROUND

A photographer is presented with many challenges when attempting to photograph a scene that includes moving content. In particular, when photographing in outdoor settings, the photographer must contend with uncontrollable factors that may influence the resulting photograph. For example, the amount of sunlight, clouds, and other naturally occurring attributes in a photograph may be difficult to manage particularly when a photographer has a limited amount of time by which to conduct the photography, such as during a vacation with a limited duration.

Often, photographers rely on digital imaging software (DIS) to modify photographs that are stored as digital images, such as to make corrections to the images. For example, a photographer may use DIS to correct or modify lighting, saturation, contrast, or other aspects in an image. In some instances, an image may be modified to add or remove content (e.g., an object, etc.) that is shown in the image. Content modification is typically a user intensive operation that is performed using existing DIS features. Content (e.g., objects, landscape, etc.) that are added to an image sometimes lack a desirable level of realism that may be detectable by a viewer with a trained eye when modifications are not preformed carefully. Thus, modification of images using DIS can require a large amount of human interaction to produce a realistic looking image when modifications take place.

In addition, it is often difficult, time consuming, and cumbersome for a user to search a repository of images when they are looking for specific content or objects, or portion thereof, to add to another image. For example, a search for "lighthouse" may produce drawings, paintings, and real images of lighthouses in a variety of different orientations and settings. A user may have to search through hundreds of images before finding an image that meets the user's requirements.

SUMMARY

Techniques and systems for providing textual, attribute-based image categorization and search are disclosed herein. In some aspects, images may be analyzed to identify a category of an image, or portion thereof. A classifier may be trained for each category and configured to generate a classifier score. The classifier scores for an image may be used to associate a category with the image. In various aspects, the categories may be types of sky sceneries.

In some aspects, the images may be analyzed to determine additional textual attributes. The additional textual attributes for sky sceneries may include one or more of a layout, a horizon position, a position of the sun, and a richness factor based on a number of detected edges in the image.

In further aspects, a user interface may provide an intuitive arrangement of the categorized images for user navigation and selection. The user interface may also provide a simplified presentation and facilitate a search of the categorized images. An Image that is selected from the user interface may be used to replace or modify features of an existing target image using a feature replacement function that may be accessible via the user interface.

BRIEF DESCRIPTION OF THE DRAWINGS

The detailed description is described with reference to the examples shown in the accompanying figures. In the figures, the left-most digit(s) of a reference number identifies the figure in which the reference number first appears. The same reference numbers in different figures indicate similar or identical items.

DETAILED DESCRIPTION

Overview

As discussed above, image manipulation using digital imaging software (DIS) may enable photographers to enhance an image when an original image lacks desired content or objects, such as a colorful sky or other content or objects. Current DIS tools often require considerable amounts of human interaction (i.e., multiple steps and thorough knowledge of DIS) to replace objects in an image. Further, it may be difficult to search through a collection of images to identify an object with predetermined attributes (e.g., color, orientation, object location, etc.).

In various embodiments, an image categorizer may be trained to classify images based on content in the images. For example and without limitation, the image categorizer may categorize images of the sky into various categories (e.g., blue sky, cloudy, etc.). Attributes such as a horizon location, position of the sun, and color information may be extracted from the image and associated with the image to enable a user search of the images. For example, the attributes and category could be stored as metadata for an image.

In some embodiments, a user may search a categorized collection of the sky images based on user-determined attributes to find a desired ("source") image. The user may then insert a portion of the source image into a target image to enhance the target image, such as to replace the sky of the target image with the sky in a source image. The source image and/or the target image may be further modified to produce a modified image that has attributes from both the target image and the source image.

As an example, a user may photograph a monument that includes a grey sky background to produce a target image. The user may desire to replace the grey sky in the target image with a more vibrant blue sky background that includes various dispersed clouds. The user may search a categorized collection of the sky images to locate a source image. Next, the user may, via an imaging application, merge part of the source image into the target image to replace the grey sky with the vibrant blue sky. Finally, the imaging application may adjust the foreground or other aspects of the target image or the portion of the source image that is transferred to the target image to enhance the realism of a modification to the target image.

The description below may expand upon the sky replacement example discussed above to illustrate various embodiments. However, embodiments are not limited to sky images or sky replacement, but may be used with other objects that are common in images such as buildings, landscapes, people, and so forth. Thus, although illustrative examples describe sky replacement, other types of image attribute replacements may be performed using the processes and systems described below.

The processes and systems described herein may be implemented in a number of ways. Example implementations are provided below with reference to the following figures.

Illustrative Environment

Figure 1:
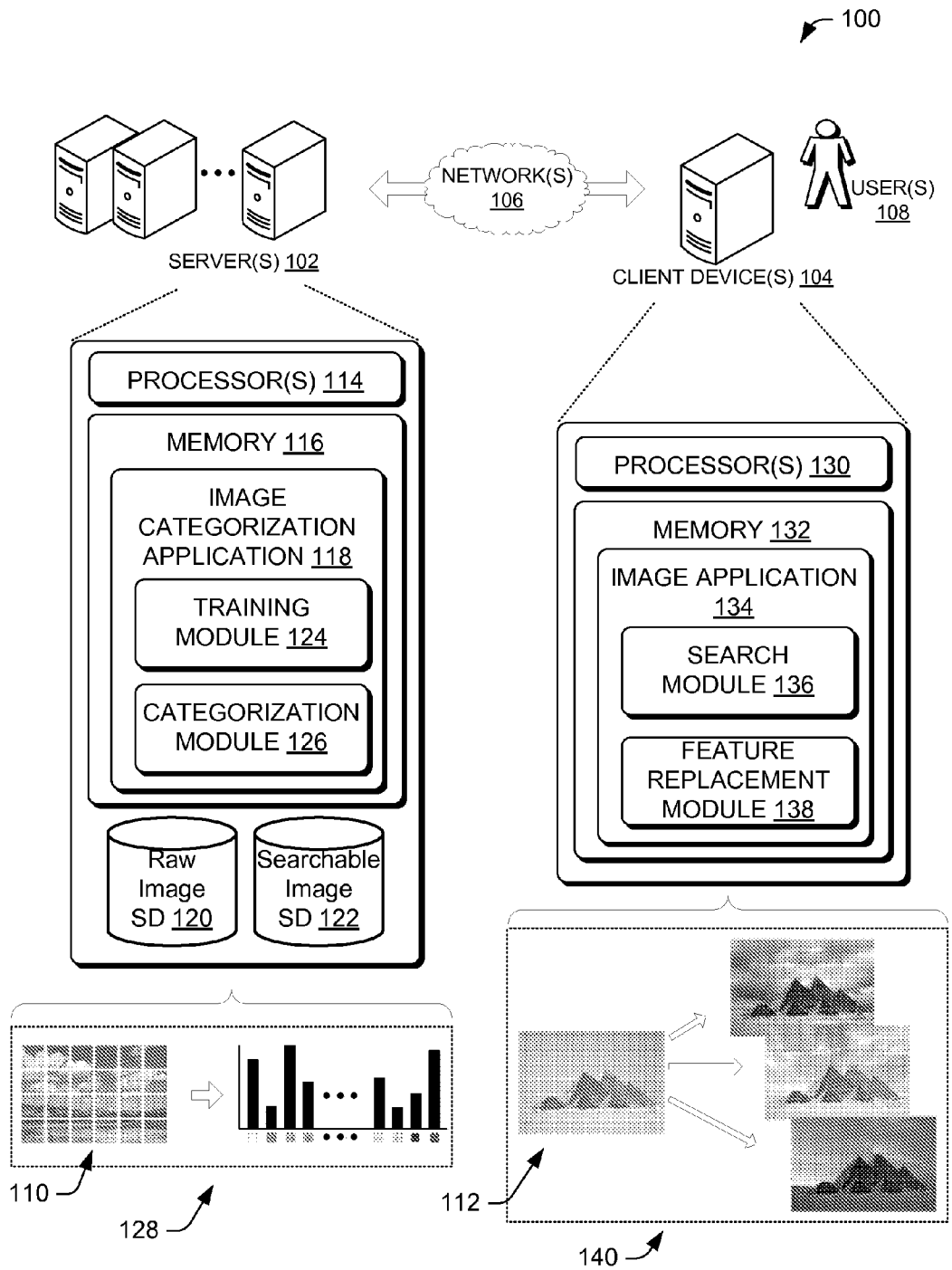
FIG. 1 is a schematic diagram of an illustrative environment where a trained categorizer categorizes images for use by a client device in accordance with embodiments of textual attribute-based image categorization and utilization.

FIG. 1 is a schematic diagram of an illustrative environment 100 where a trained categorizer may categorize images for use by a client device in accordance with embodiments of textual attribute-based image categorization and utilization. The environment 100 includes servers 102 that are configured to categorize images based on various textual attributes of the images. Textual attributes are attributes of an image that may be used to describe the attributes in common language (e.g., during a search) and for other functions (e.g., sorting images, classification, etc.). As discussed herein, attributes are textual attributes unless otherwise stated. In some embodiments, the servers 102 may be in communication with one or more client device(s) 104 via a network 106. The client device(s) 104 may enable a user 108 to access a source image 110 from the servers 102 and manipulate a target image 112 with a portion of a selected one of the categorized images. The client device(s) 104 may be a server, a desktop computer, a tablet, a mobile computer, a mobile telephone, a gaming console, or a music player, among other possible client devices. As described or referenced herein, the source image 110 is an image that is categorized (indexed) by one or more of the servers 102, and may also be interchangeably referred to herein as a categorized image or an indexed image. The target image 112 is an image that the user 108 intends to manipulate and may also be interchangeably referred to herein as a user image.

In an example configuration, servers 102 may include one or more processors ("processors") 114 and system memory 116. Depending on the exact configuration and type of server, system memory 116 may be volatile (such as RAM), non-volatile (such as ROM, flash memory, etc.) or some combination of the two. System memory 116 may include an image categorization application 118 to perform the functions described herein.

The servers 102 may be in communication with various storage devices (SDs) such as a raw image SD 120 and a searchable image SD 122. The raw image SD 120 may include a collection of uncategorized images which may be obtained from a variety of locations, such as disbursed storage locations across the Internet, photography hosting sites, archived sites, and so forth. In some embodiments, the image categorization application 118 may crawl the Internet and/or other networks of computers to locate and copy images from an original location to the raw image SD 120. The searchable image SD 122 may be used to store the source images 110 after they have been categorized by the various modules of the image categorization application 118.

In accordance with one or more embodiments the image categorization application 118 may include a training module 124 and a categorization module 126, among other possible modules. The training module 124 may be used to train the image categorization application 118 to categorize images by textual attributes that are identified in an image. For example, the training module 124 may be trained to categorize an image as having a blue sky, a cloudy sky, or a sunset, among many possibilities, as described further below. In addition, the training module 124 may be trained to identify and select a sky region of an image (as distinguished from objects, landscape, or other non-sky features).

In some embodiments, the categorization module 126 may categorize an image based on trained attribute detection by the training module 124. For example, the categorization module 126 may select an image from the raw image SD 120, analyze the image based on one or more trained classifier algorithms via a process 128, and then associate textual attributes with the image, or portion thereof, which may then be stored as the source image 110 in the searchable image SD 122.

The client device(s) 104 may also include one or more processors ("processors") 130 and system memory 132. The system memory 132 may be volatile (such as RAM), non-volatile (such as ROM, flash memory, etc.) or some combination of the two. System memory 132 may include an image application 134 to perform the functions described herein. In accordance with one or more embodiments, the image application 134 may include a search module 136 and a feature replacement module 138, among other possible modules.

In some embodiments, the search module 136 may enable the user 108 to select desired attributes via a user interface and then receive images in a search result that match one or more attributes of the search. For example, the search module 136 may enable the user 108 to specify sky replacement attributes that include a category (e.g., blue sky, cloudy, sunset, etc.), horizon, sun location, a richness level, layout, and/or other possible attributes. The attributes may be unique to the type of image that is categorized, thus attributes associated with images of people may be different than attributes associated with sky replacement images. In various embodiments the search module 136 may enable a user to refine a search and/or navigate though search results to locate an image that is similar to another identified image. In some embodiments all of (or portion thereof) the search module 136 may be stored by or executed by the one or more servers 102.

The feature replacement module 138 may enable a user to replace a feature in the target image 112 with a feature from the source image 110. For example, the feature replacement module 138 may replace the sky from the target image 112 with the sky in the source image 110. In some embodiments, the feature replacement module 138 may perform various modifications to the target image 112 to enhance the realism of the target image. For example, the feature replacement module 138 may adjust colorization, tone, contrast, or other aspects of the target image upon or after modification of the target image 112 with portions of the source image 110.

As an example, the target image 112 may undergo a sky replacement process 140 by the feature replacement module 138 to replace the sky. The user 108 may then replace a relatively featureless blue sky in the target image with a cloudy sky, rich blue sky, or sunset sky, among various other feature replacement possibilities that are in the source images 110.

Illustrative Operation

Figure 2:
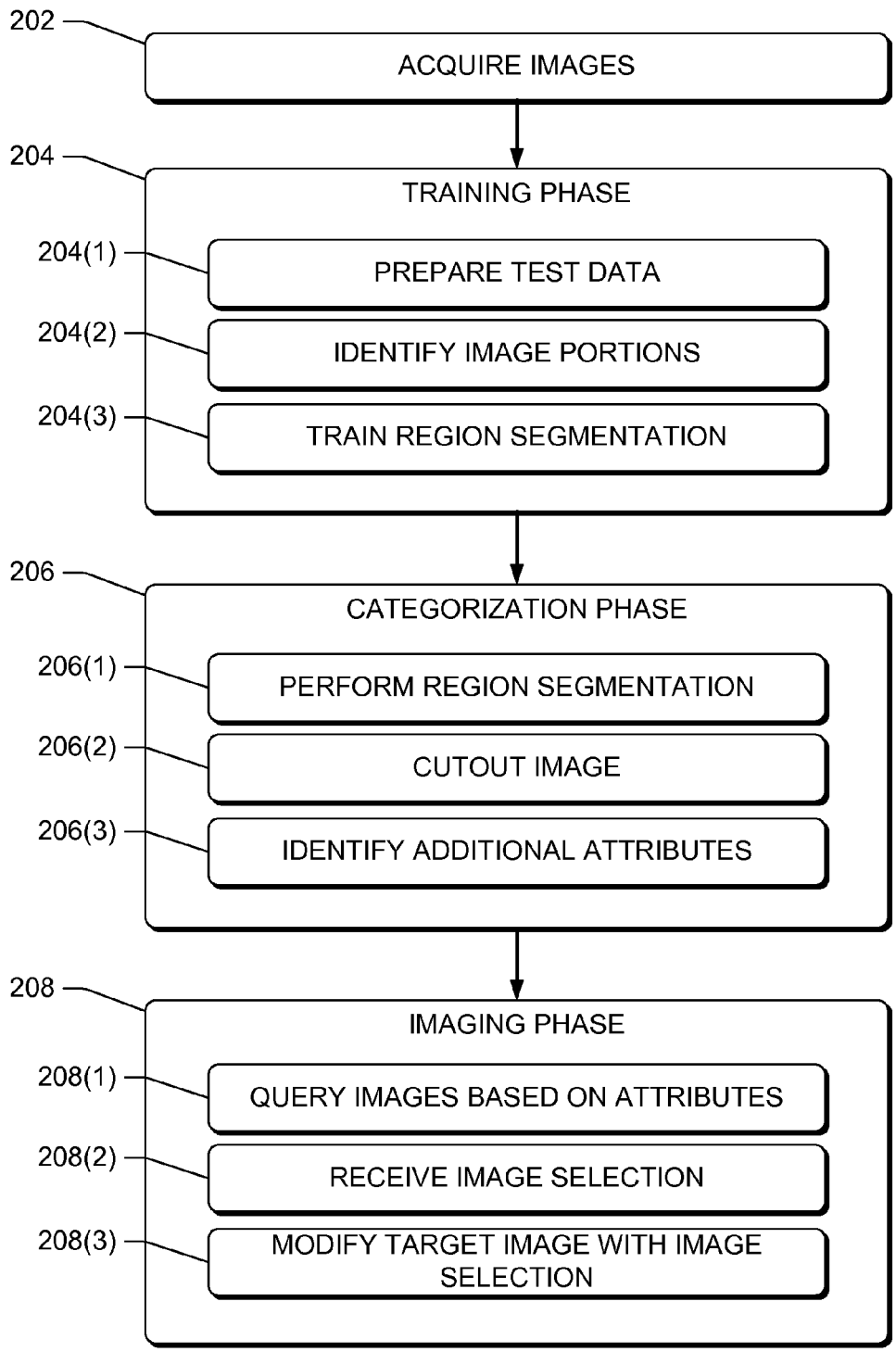
FIG. 2 is a flow diagram of an illustrative process of implementing components of a system that include training, categorizing, and imaging in accordance with embodiments of the disclosure.

FIG. 2 is a flow diagram of an illustrative process 200 of implementing components of a system that include training, categorizing, and imaging in accordance with embodiments of the disclosure. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly. The process 200 will be discussed with reference to the environment 100 of FIG. 1.

At 202, the image categorization application 118 may acquire images for categorization (indexing) and/or for use by the image application 134. In some embodiments, the images by be obtained by crawling a network, such as the Internet, to obtain images. For example, a list of sites that include public licensed images (i.e., copyright free) may be used as a source of the images and may include sites that enable photographers to post images. The acquired images may be stored in the raw image SD 120.

At 204, the image categorization application 118 may implement a training phase via the training module 124, which may execute sub-operations 204(1)-204(3) to accomplish training of a classifier to categorize images based on textual attributes. At 204(1), the training module 124 may prepare test data for the training process. For example, images may be selected as representative samples for various attributes, which may be labeled for the training phase. At 204(2), an image portion to be categorized may be identified by the training module 124. For example, in the sky replacement scenario, a sky region of an image may be labeled as "cloudy" at 204(1), and selected at 204(2). At 204(3), the training module 124 may be trained to execute a region segmentation process that identifies attributes of the image portions using a trained codebook.

In accordance with various embodiments, at 206 the image categorization application 118 may implement a categorization phase having sub-operations 206(1)-206(3). At 206(1), the categorization module 126 may perform region segmentation, as trained at 204(3), to identify one or more attributes of the image. At 206(2), the categorization module 126 may cut out the image portion, such as by identifying the image portion boundary and removing extraneous data. At 206(3), the categorization module 126 may identify additional textual attributes. In the sky replacement example, the additional attributes may include a horizon line, a position of the sun, a richness factor, and a layout factor, among other possible textual attributes.

In some embodiments, the image application 134 may perform an imaging phase, which may execute sub-operations 208(1)-208(3) to accomplish selection of an image and modification of the target image 112. At 208(1), the search module 136 may query images from the searchable image SD 122 based on user-selected attributes. At 208(2), the search module 136 may receive an image selection from the user 108 as the source object 110. At 208(3), the feature replacement module 138 may modify the target image 112 with the source images 110 that is selected at the operation 208(2).

FIGS. 3-12 provide further details on the training phase operation 204, the categorization phase operation 206, and the imaging phase operation 208, which are divided into the following sections of Illustrative Training, Illustrative Categorizing, and Illustrative Imaging, respectively. Each of the FIGS. 3-12 is discussed with reference to the environment 100 of FIG. 1 and/or any preceding figures in this description.

Illustrative Training

Figure 3:
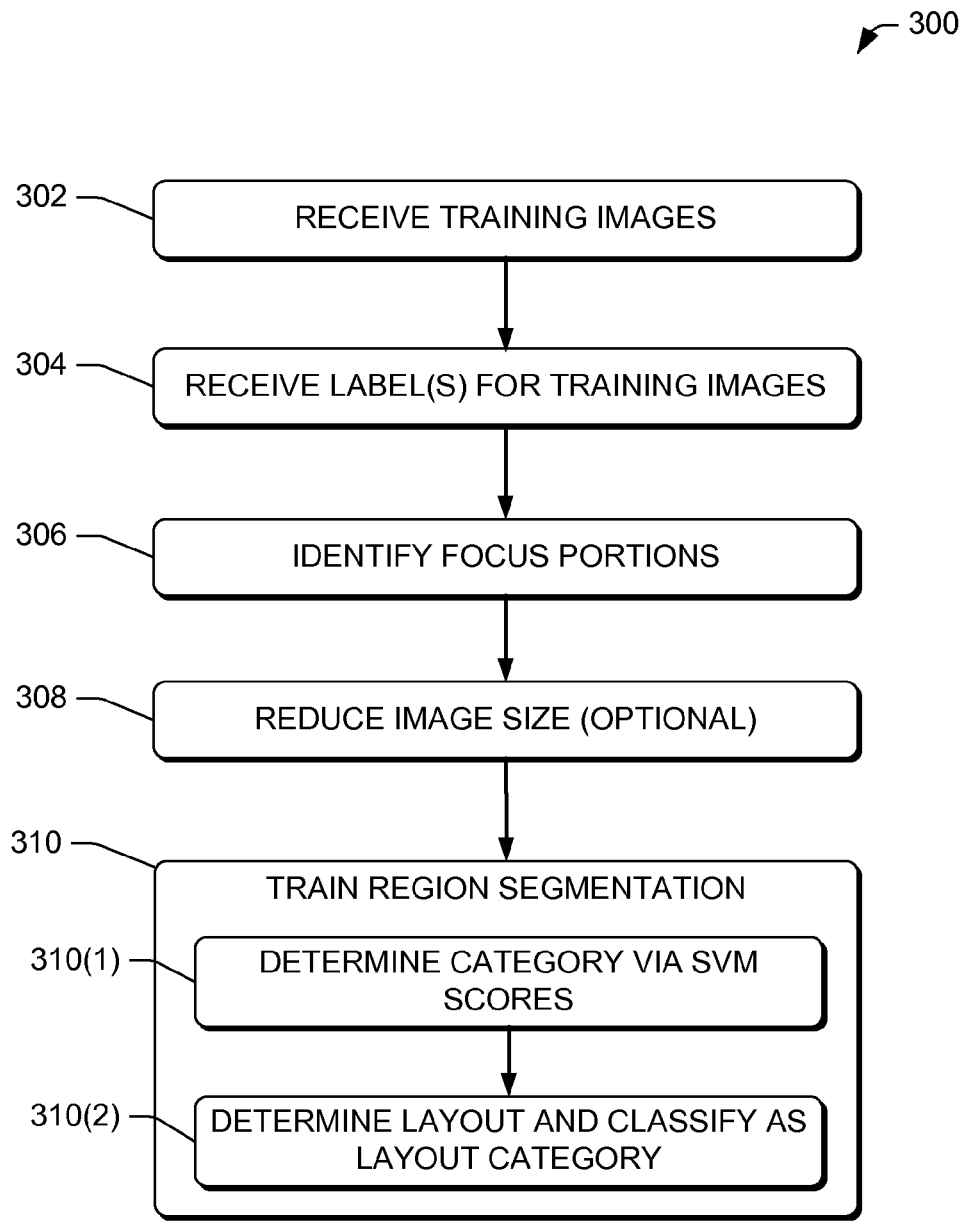
FIG. 3 is a flow diagram of an illustrative training process in accordance with embodiments of the disclosure.

FIG. 3 is a flow diagram of an illustrative training process 300 in accordance with embodiments of the disclosure. The training process 300 may be performed by the training module 124 and/or other appropriate modules stored on the servers 102 or the client devices 104.

At 302, the training module 124 may receive training images for training the categorization module 126. The training images may be samples of each category or unique instance of an attribute, category, or the like. For example, when training a sky replacement application, the training images may include a number of images of each category that may include, without limitation, blue sky images, cloudy sky images, and sunset images.

At 304, the training module 124 may receive one or more labels for the training images. For example, the labels may indicate the category (e.g., blue sky, cloudy, etc.) and/or other textual attribute information (e.g., location of sun, horizon position, sky boundary, etc.). In another illustrative example that involves a building replacement application, the labels may indicate a type of building (e.g., office tower, house, parking garage, etc) and/or other attribute information (e.g., number of floors, color, etc.).

At 306, the training module 124 may identify a focus portion of an image (e.g., the sky region, etc.). For example, the focus portion may be selected using any available image cutout tool known in the art to separate the focus portion from the image (e.g., sky and non-sky regions).

At 308, the image size may be reduced to expedite processing by the one or more processors 114 when training the categorization module 126. In some embodiments, the training image may be resized such that the width and height do not exceed about 400 pixels.

At 310, the training module 124 may perform region segmentation that includes sub-processes of category training at 310(1) and layout training at 310(2), each being discussed in turn.

In some embodiments, the training module 124 may train multiple classifiers (e.g., one classifier for each category) at 310(1). In some embodiments, the training module 124 may train a support vector machine (SVM) classifier for each category. For example, a blue sky classifier may be trained using a blue sky training images as positive examples and the other training images (cloudy, sunset, etc.) as negative examples. For each image, the training module 124 may apply each of the classifiers, which output an SVM score for each category. Thus, the blue sky classifier would have a blue sky score and so forth for each classifier.

The SVM scores describe a degree of membership of an image to the categories. In some embodiments, the scores may be used to arrange the images in a user interface to enable simplified user-selection and navigation of the images. For example, when three categories are used, then three SVM scores are generated and may be used to arrange the images in a triangular chart representing three-dimensional (3D) space based on the three SVM scores. Similarly, when two categories are used, the images may include two scores that enable the images to be plotted on a two-dimensional (2D) chart or a line chart. Representation of the images is described below with reference to a user interface shown in FIG. 10. Ultimately, the SVM scores may be used as a category attribute.

At 310(2), the training module 124 may determine a layout of the image. The training module 124 may individually train a sky/non-sky pixel classifier for each of the categories using the training images of 302 with the focus portions of 306. Each classifier may use a same visual descriptor as used in the categorization training of 310(1) and the patches from the sky/non-sky region within the category as the positive/negative examples. The classifier may be implemented via Random Forests® (or another comparable algorithm) to output a soft label ([0,1]) for each pixel. After the pixel level classification, obtained soft labels may be used as the data terms in a graph cut based segmentation to produce a binary focus portion map. After the segmentation, the training module 124 may discard images where the focus portion is less than a predetermined percentage of the entire image (e.g., <30% of the image area).

In accordance with some embodiments, the training module 124 may extract layout attributes as follows. First, using the focus portion map, a line of the horizon may be estimated by moving a horizontal line upwards from the bottom of the image, until a number of sky pixels below the line is greater than a predetermined percent (e.g., 5%, etc.). Next, the focus portion may be categorized into a predetermined layout type. In the context of the sky replacement, they layout types may include: full-sky, (e.g., the sky region covers the whole image); object-in-sky, (e.g., the sky region covers the whole image except for one or more portions that may be due to an extraneous object such as a bird); landscape, (e.g., approximately 95%-100% of the pixels above the horizon are sky pixels); normal-sky, (e.g., approximately 75%-95% of the pixels above the horizon are sky pixels); and others (e.g., the remaining images). The layout types may be different for other types of images, such that a building replacement categorizer may use building layout types that are different from the sky replacement examples listed above.

Figure 4:
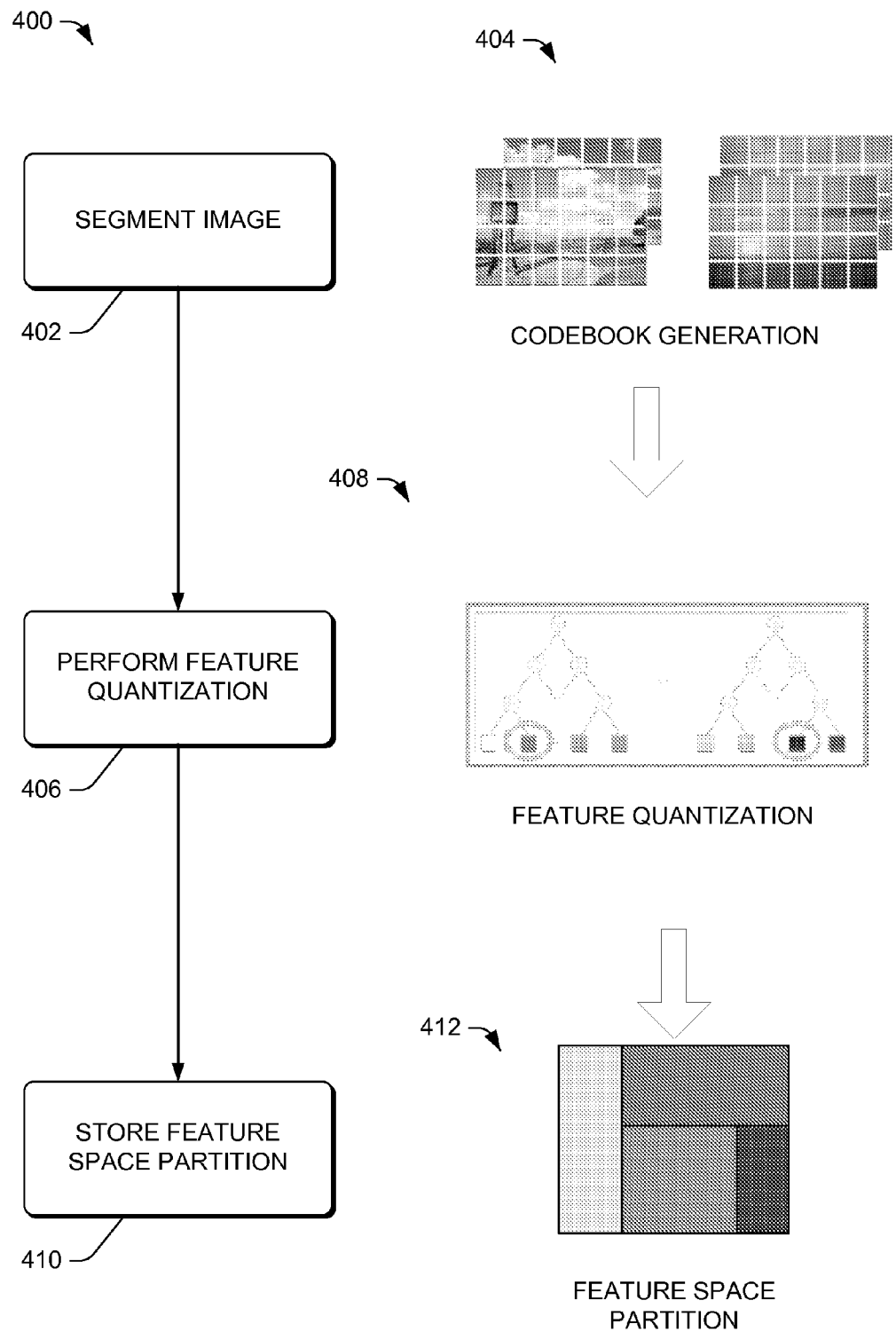
FIG. 4 is a pictorial flow diagram of an illustrative training process to train a codebook to perform categorization of images in accordance with some embodiments of the disclosure.

FIG. 4 is a pictorial flow diagram of an illustrative training process 400 to train a codebook to perform categorization of images in accordance with some embodiments of the disclosure. The training process 400 may be performed by the training module 124 and/or other appropriate modules stored on one or more of the servers 102 or one or more of the client devices 104.

At 402, an image is segmented into patches 404. The image may be evenly divided to create a number of the patches 404 for sampling, such as 16×16. Selection of smaller patches (i.e., larger number of the patches 404) may enable a classifier to obtain more detailed information on an image while selection of larger patches may increase performance of the process 400.

At 406, the training module 124 may perform feature quantization using Random Forests® (or another comparable algorithm) to create a codebook. The training module 124 may represent each of the training images as a "bag-of-words", which is a collection of evenly sampled patches (e.g., 16×16 patches, etc.). For example 16×16 patches at 400 pixels may be sampled at 8-pixel intervals. Each patch may be assigned to a nearest codeword in a visual codebook. The patch may be represented by the concatenation of a scale-invariant feature transform (SIFT) descriptor (histogram) and mean hue, saturation and value (HSV) color. In some embodiments, a codebook with about 2,500 codewords may be trained on about 250,000 patches that are randomly sampled from all training images, such as by using Random Forests® (or another comparable algorithm). Each patch may be assigned to one codeword in one tree 408. The image may be represented by a histogram of visual words, such as to describe the category of the image (e.g., blue sky visual words, etc.).

At 410, the training module may store the feature space partition 412 for the codebook. The feature space partition may enable categorization of the patches of images, and thus the images, into the categories that are defined for the image (e.g., blue sky, cloudy sky, sunset, or other types of categories).

Illustrative Categorization

Figure 5:
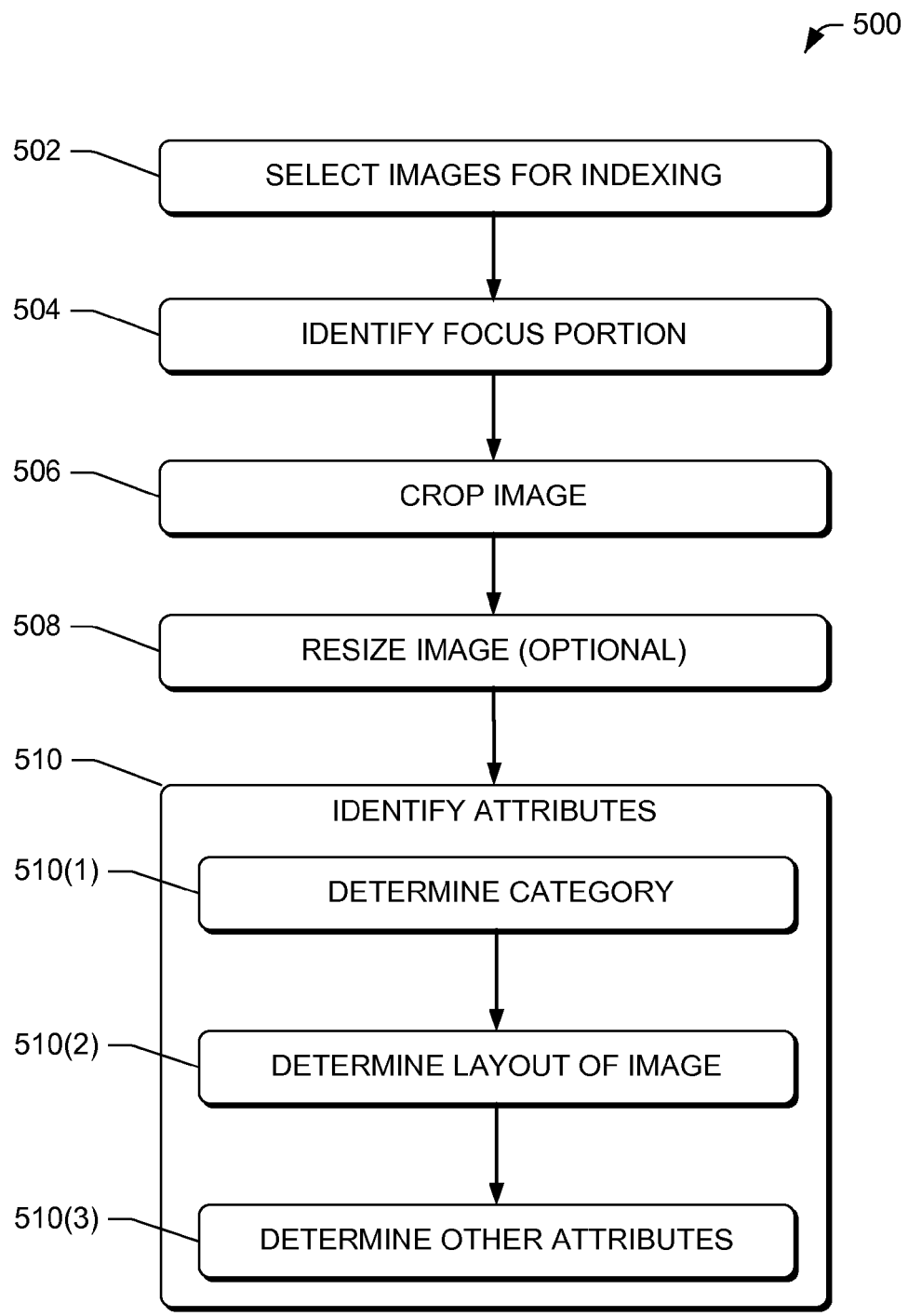
FIG. 5 is a flow diagram of an illustrative categorization process in accordance with various embodiments of the disclosure.

FIG. 5 is a flow diagram of an illustrative categorization process 500 in accordance with various embodiments of the disclosure. The categorization process 500 may be performed by the categorization module 126 and/or other appropriate modules stored on one or more of the servers 102 or one or more of the client devices 104.

At 502, the categorization module 126 may select images for categorization. The images may be the source images 110 that are stored in the raw image SD 120.

At 504, the categorization module 126 may identify focus portions. For example, the focus portions for a sky replacement image categorization application may include a sky portion as distinguished from a non-sky portion.

At 506, the categorization module 126 may crop (or cut out) the focus portion of the image for categorization. For example, the sky portion may be isolated to enable further processing of patches of the sky portion for classification.

At 508, the image may be optionally reduced in size to enable further processing. For example, the image size may be reduced to 400 pixels in each direction of length and width, or another pixel value, percentage, etc., that is less than the original image size.

At 510, the categorization module 126 may identify attributes of the image via various sub-processes 510(1)-510 (3), each discussed in turn.

At 510(1), the categorization module 126 may determine a category of the image (e.g., blue sky, cloudy, sunset, etc.) based on the codebook score. The patches of each image may be processed by each classifier (for each category) and a score may be computed that is representative of the category of the image.

At 510(2), the categorization module 126 may determine a layout of the image. As discussed above, the layout may be determined by identifying an approximate horizon line (or other distinguishing feature) and then categorizing the layout accordingly. In the sky replacement example, the layout may be categorized as one of full-sky, object-in-sky, landscape, normal-sky, or other.

At 510(3), the categorization module 126 may determine other attributes of the image. For example, the categorization module 126 may determine a horizon line, a position of the sun, a richness value, or other textual attributes of the image. The textual attributes may be used by a user interface to enable a user to select attributes during a search, which may enable retrieval of source images having the selected attributes. Further details on the other textual attributes are discussed with reference to FIG. 8.

Figure 6:
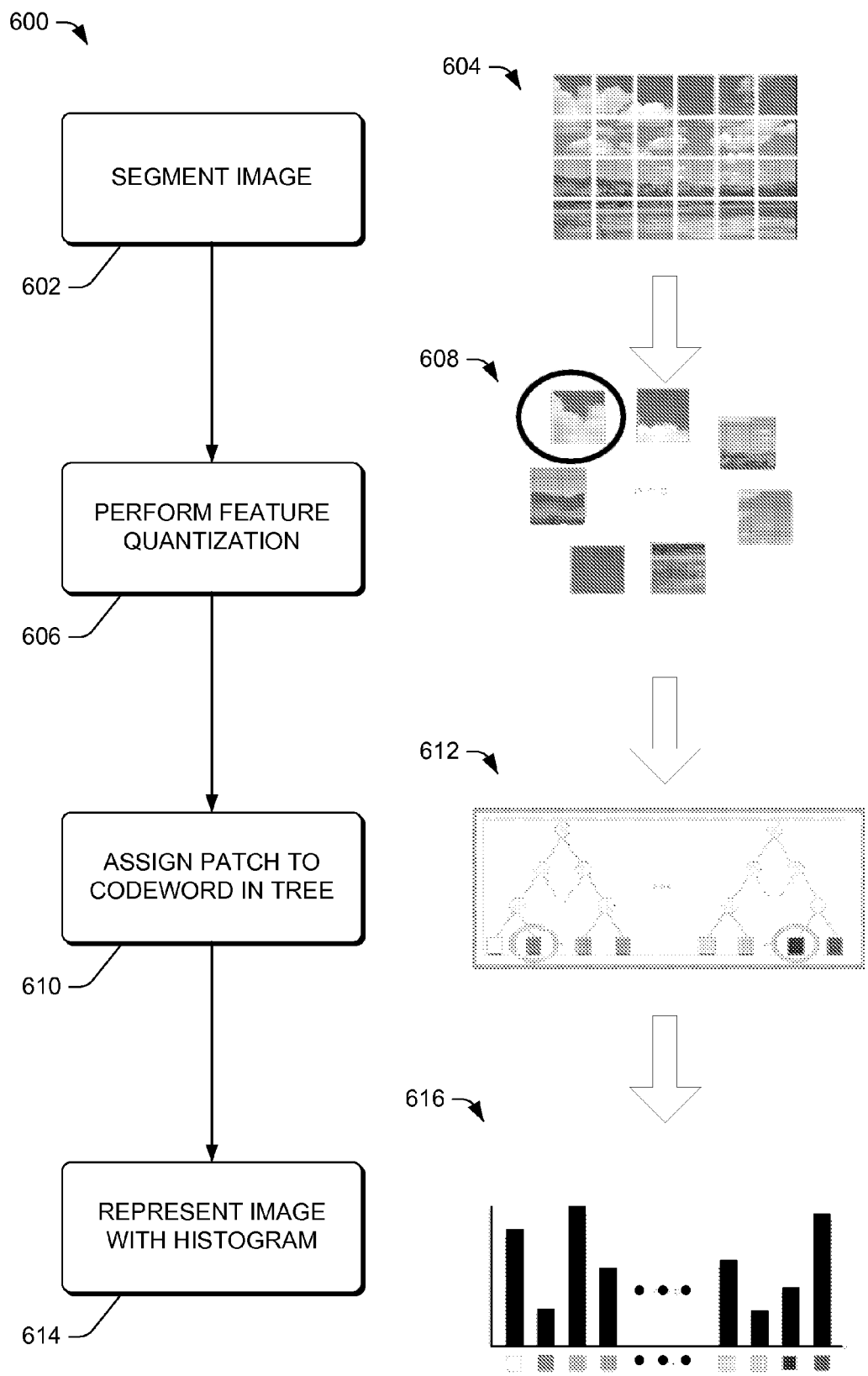
FIG. 6 is a pictorial flow diagram of an illustrative process of using the codebook of FIG. 4 to categorize images in accordance with one or more embodiments of the disclosure.

FIG. 6 is a pictorial flow diagram of an illustrative process 600 of using the codebook that is described in the process 400 of FIG. 4 to categorize images in accordance with one or more embodiments of the disclosure.

At 602, the categorization module 126 may segment an image 604 (e.g., the source image 110) into patches. In some embodiments, the patches may be equally sized.

At 606, the categorization module 126 may perform feature quantization on each patch 608 to determine a score from the codebook that was created in the process 400.

At 610, the categorization module 126 may assign each patch to a codeword in a tree 612.

At 614, the categorization module 126 may present each image (via the patches) with a histogram that represents all of the patches. The histogram may be a unique identifier of the image and enable classification of the image, such as one of blue sky, cloudy sky, or sunset. In some embodiments, the histogram may enable arrangement of the image relative to other images by having a score for each category, which is discussed next.

Figure 7:
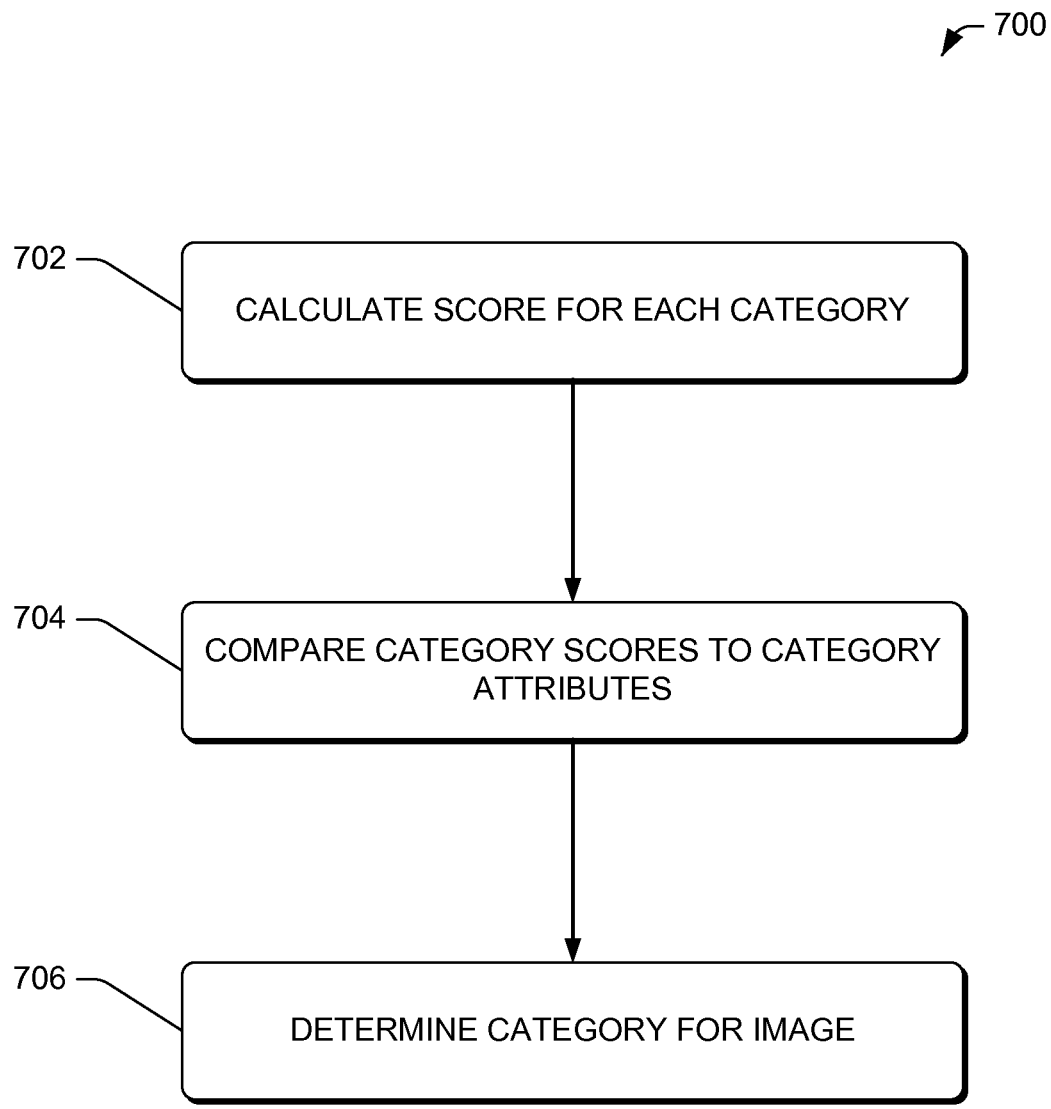
FIG. 7 is a flow diagram of an illustrative process of scoring images to determine a category for the image in accordance with various embodiments of the disclosure.

FIG. 7 is a flow diagram of an illustrative process 700 of scoring images to determine a category for the image in accordance with various embodiments of the disclosure.

At 702, the categorization module 126 may calculate a score for each category. For example, an image may have a blue sky score, a cloudy sky score, and a sunset score. The scores may be calculated by classifiers for each category (e.g., blue sky classifier, etc.).

At 704, the categorization module 126 may compare the category scores to category attributes. The combination of these scores may enable an arrangement of the images with respect to other images (having different histograms/scores) in a user interface. A user interface is discussed below with reference to FIG. 10.

At 706, the categorization module 126 may determine a category for the image. For example, the image may be labeled as one of blue sky, cloudy sky, or sunset, among other possible categories.

Figure 8:
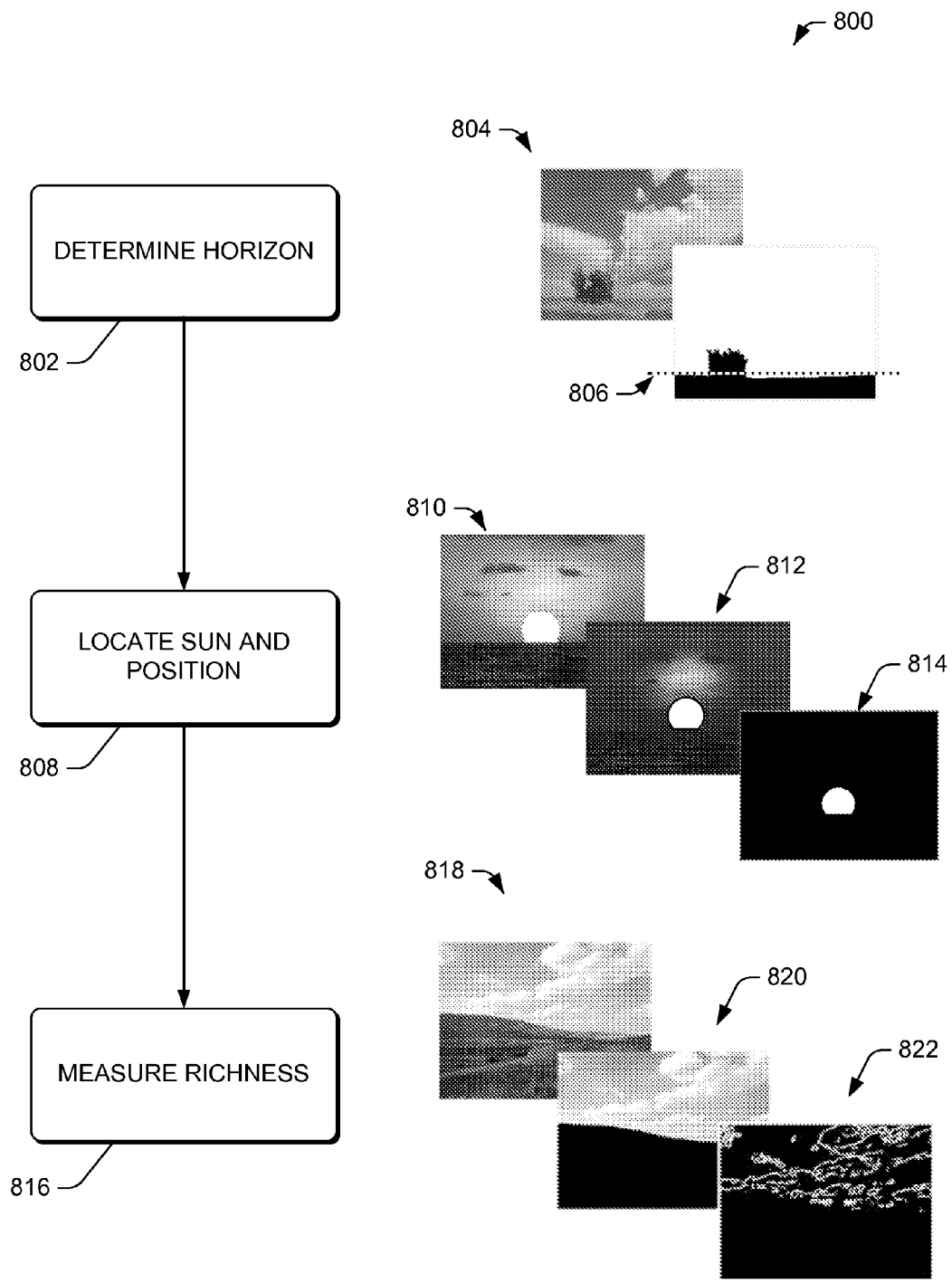
FIG. 8 is a pictorial flow diagram of an illustrative process of determining textual attributes of images in accordance with some embodiments of the disclosure.

FIG. 8 is a pictorial flow diagram of an illustrative process 800 of determining textual attributes of images in accordance with some embodiments of the disclosure.

At 802, the categorization module 126 may determine the horizon of the image. The horizon of the image may be determined by moving a horizontal line upwards from the bottom of an image 804 until a number of sky pixels below the line is greater than a predetermined percent (e.g., 5%, etc.). A horizon line 806 may be identified and recorded for later use, such as for a searchable textual attribute in a user interface.

At 808, the categorization module 126 may determine whether a sun is included in the image, and if so, the location of the sun in an image 810. An intensity difference between sun and clouds is larger in the CMYK color space for sunset and cloudy skies than for other color spaces which may be analyzed at 812 by each color channel. When the image is categorized in the sunset category, the categorization module 126 may detect a largest connected component whose brightness is greater than a threshold (e.g., 245 by default) in the magenta (M) channel. When the image is categorized in the cloudy sky category, the categorization module 126 may perform a similar detection in the black (K) channel. If the aspect ratio of the detection region is within the range (e.g., [0.4, 2.5]) and the ratio of region's area to the area of region's bounding box is greater than 0.5 (an empirical description to the shape of visible sun), a sun is detected at 814. The existence and location of the sun may be identified and recorded for later use, such as for a searchable textual attribute in a user interface.

At 816, the categorization module 126 may measure a richness value of an image 818. The richness value may be a measure of the "activity" in the image which may be determined by the number of edges located sky region 820 of the image. In some embodiments, the richness of the sky or clouds may be characterized by the amount of image edges. An adaptive linear combination of the edges numbers detected at 822 by a Sobel detector and a Canny detector in the sky region may be used to assess the edges, since the Canny detector is good at detecting small scale edges while the Sobel detector is more suitable for middle and large scale edges. In one implementation, the categorization module 126 may use the Sobel detector and Canny detector by using ns and nc as the detected edge numbers. The edge number n of the image is defined by equation 1.

$$n = \kappa \cdot ns \cdot s(-ns-1000\ 100) + nc \cdot s(ns-1000\ 100)$$ Equ. 1 where $s(x)=1\ 1+\exp(-x)$ is a sigmoid function and $\kappa$ is a constant parameter to make the edge number of Sobel and Canny comparable (empirically set to 8). The equation indicates that if the edge number by the Sobel detector is small, a more weight is given to the Canny detector and vice versa. The categorization module 126 may then quantize the edge number into various intervals (e.g., five intervals) so that the set of images in the database are evenly divided. Finally, each image may be assigned to one of the intervals of richness (e.g., 1 through 5, etc.). The richness factor may be identified and recorded for later use, such as for a searchable textual attribute in a user interface.

Figure 9:
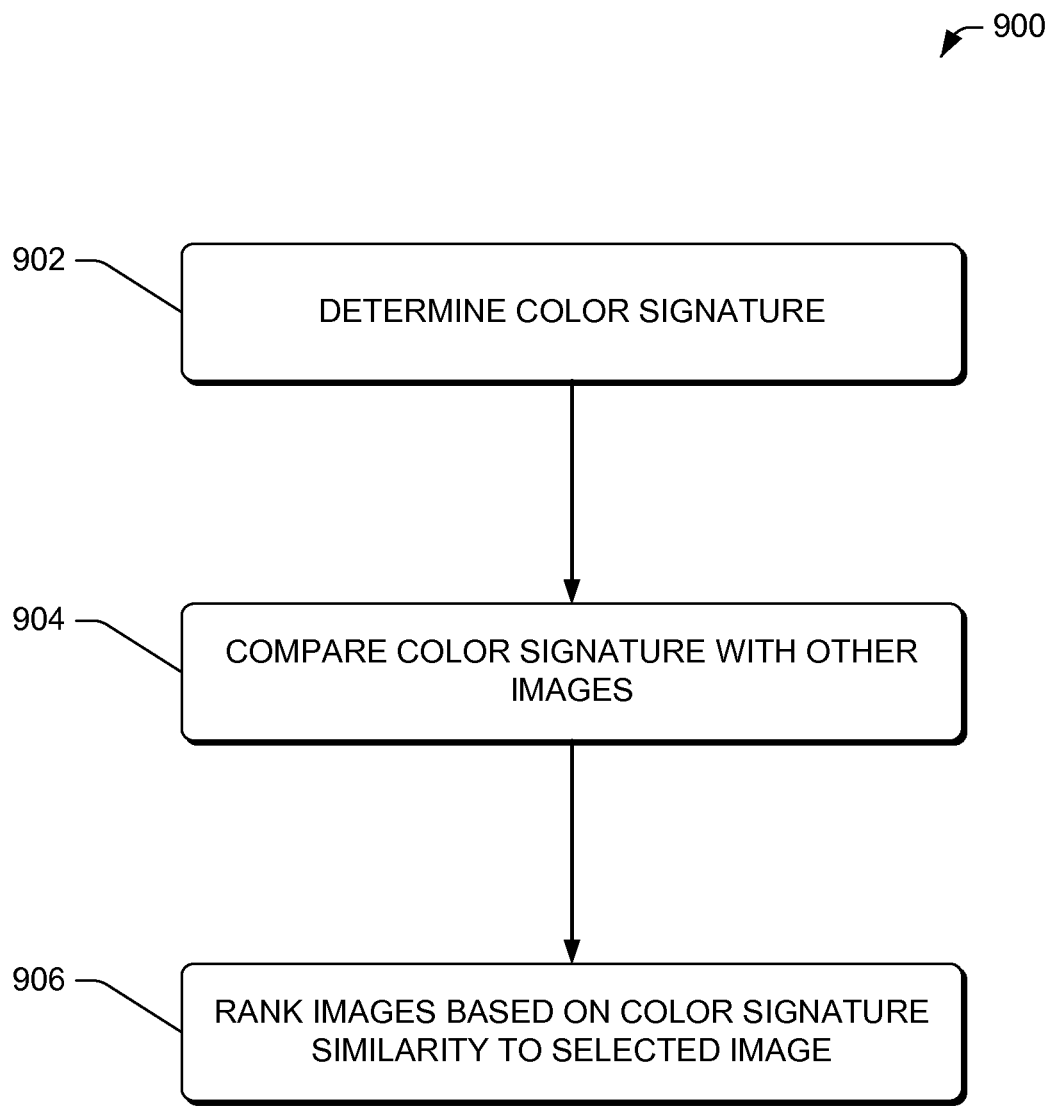
FIG. 9 is a flow diagram of an illustrative process of ranking images based on color signature in accordance with some embodiments of the disclosure.

FIG. 9 is a flow diagram of an illustrative process 900 of ranking images based on color signature in accordance with some embodiments of the disclosure. The users 108 may find color to be an important characteristic in an image source, particularly when trying to enhance an image in a particular manner.

At 902, the categorization module 126 may determine a color signature. The color of each sky image may be defined by a color signature as shown in equation 2.

$$s = \{w_k, c_k\}_{k=1}^{K}$$ Equ. 2 where $w_k$ is a weight, $c_k$ is a color in LAB space, and $K(=3)$ is the number of color components. The color signature may be obtained offline by clustering all pixels in the sky region using the K-means algorithm.

At 904, color signatures may be compared across images. At any time during the search, the user 108 may select an image of interest and find more similar results in terms of the color using the process 900.

At 906, the images may be ranked based on the color signature similarity as compared to a selected image. A similarity between two signatures may be measured by the Earth Mover's Distance (EMD). The results may be ranked based on the EMD distance. The ranking of the images may be useful in a user interface having a visual display of the source images as described next in section.

Illustrative Imaging

Figure 10:
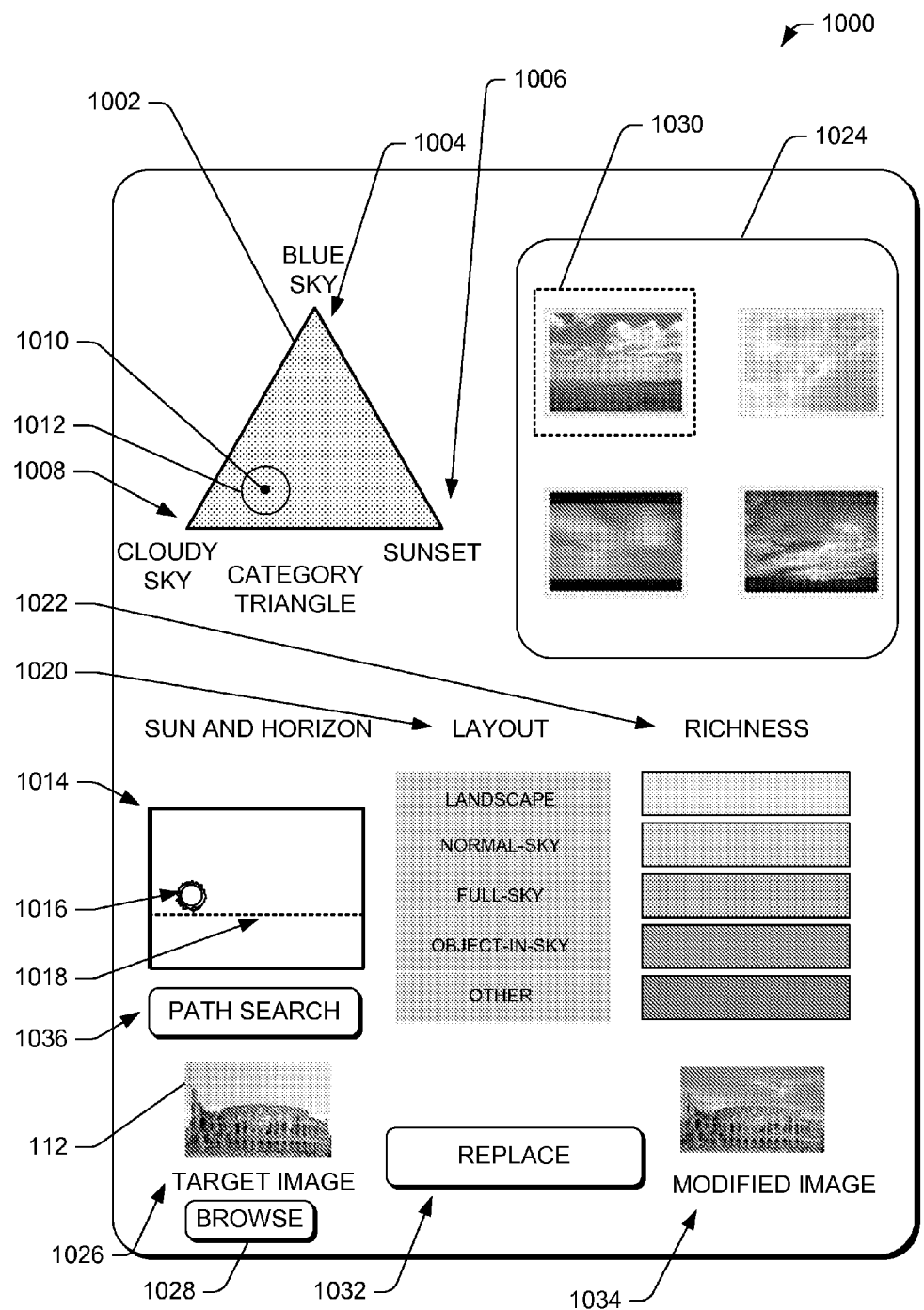
FIG. 10 is an illustrative user interface to enable user selection and manipulation of images based on various user-selected attributes in accordance with one or more embodiments of the disclosure.

FIG. 10 is an illustrative user interface 1000 to enable user selection and manipulation of images based on various user-selected attributes in accordance with one or more embodiments of the disclosure. A received user selection may be used by the search module 136 to locate images stored in the searchable image SD 122 that have been categorized by the categorization module 126.

In some embodiments, the user interface 1000 may include a category triangle 1002 that may enable user-selection of an image based on the predetermined categories (e.g., blue sky, cloudy sky, sunset). The category triangle 1002 is representative of one possible shape that may provide an intuitive display of images that are categorized into three categories. Other shapes, including lines, squares, circles, hexagons, etc. may be better suited when other numbers of categories are used by the categorization module 126.

As discussed above in with reference to FIG. 7, each image may have three category (SVM) scores, which can be viewed as a point in a 3D space. A set of points from the images in the searchable image SD 122 may be represented to lie approximately on a flat "triangle" in three-dimensions (3D). To provide a simple interface selection, the search module 136 may project these points into a 2D triangle using principal components analysis.

The category triangle 1002 may be presented as an equilateral triangle that provides a semantic organization of the source images. When a user traverses the triangle from a blue sky vertex 1004 to a sunset vertex 1006, the images may gradually change from blue sky with white clouds in daytime, to sky with red clouds and a dark foreground at sunset. The images in between the blue sky vertex 1004 to the sunset vertex 1006 tend to have skies before sunset. Similarly, clouds may gradually change from white to grey when the user 108 traverses from the blue-sky vertex 1004 to a cloudy-sky vertex 1008. The images in the center of the triangle may include a mixture of the three categories.

The user interface 1000 may enable the user 108 to place and move a 2D reference point 1010 in the triangle. Images within a range 1012 surrounding the reference point 1010 may be retrieved and ranked in terms of their 2D distance to the reference point. The user may also specify a radius of the range 1012 to limit the number of retrieved images.

The user interface 1000 may include a sun and horizon selector 1014. The user 108 may be enabled to intuitively select (e.g., draw, drag, etc.) positions of a sun 1016 and a horizon 1018, or omit (e.g., delete or omit from selector) the sun and/or horizon. The user selections in the sun and horizon selector 1014 may enable a search by the search module 136 of images with attributes that substantially match the information (e.g., sun position, horizon position) that may be selected by the user, which is categorized via the operations 806 and 808 of the process 800.

In some embodiments, the user interface 1000 may also include a layout selector 1020. A received layout selection may correspond to searchable attributes of images which are categorized at the operation 510(2) of the process 500.

The user interface 1000 may include a richness selector 1022. A received richness selection may correspond to searchable attributes of images which are categorized at the operation 816 of the process 800. The layout selector 1020 and/or the richness selector 1022 may be implemented as drop-down selectors or via other techniques to enable user selection of one of many possible layout features or richness levels.

The user interface 1000 may include a search results display section 1024 to display results that match any user selections made using the various controls described above including the category triangle 1002, the sun and horizon selector 1014, the layout selector 1020, the richness selector 1022, and/or other controls that may be implemented in the user interface. In accordance with embodiments, the display section 1024 may be actively updated when the user changes selections, such as by refreshing the images in the display section when a user drags a mouse across the category triangle 1002 to move the reference point 1010.

The user interface may include a target image selection portion 1026 to select (e.g., via a browse button 1028, etc.) and display the target image 112 that may be modified by replacing one or more motions of the target image with a selected image 1030 from the display section 1024. A replace command 1032 may initiate a feature replacement and generate a modified image 1034 for display to the user.

In some embodiments, the user interface 1000 may also include a path search selector 1036 to initiate the search module 136 to perform a path selection as described below.

Figure 11:
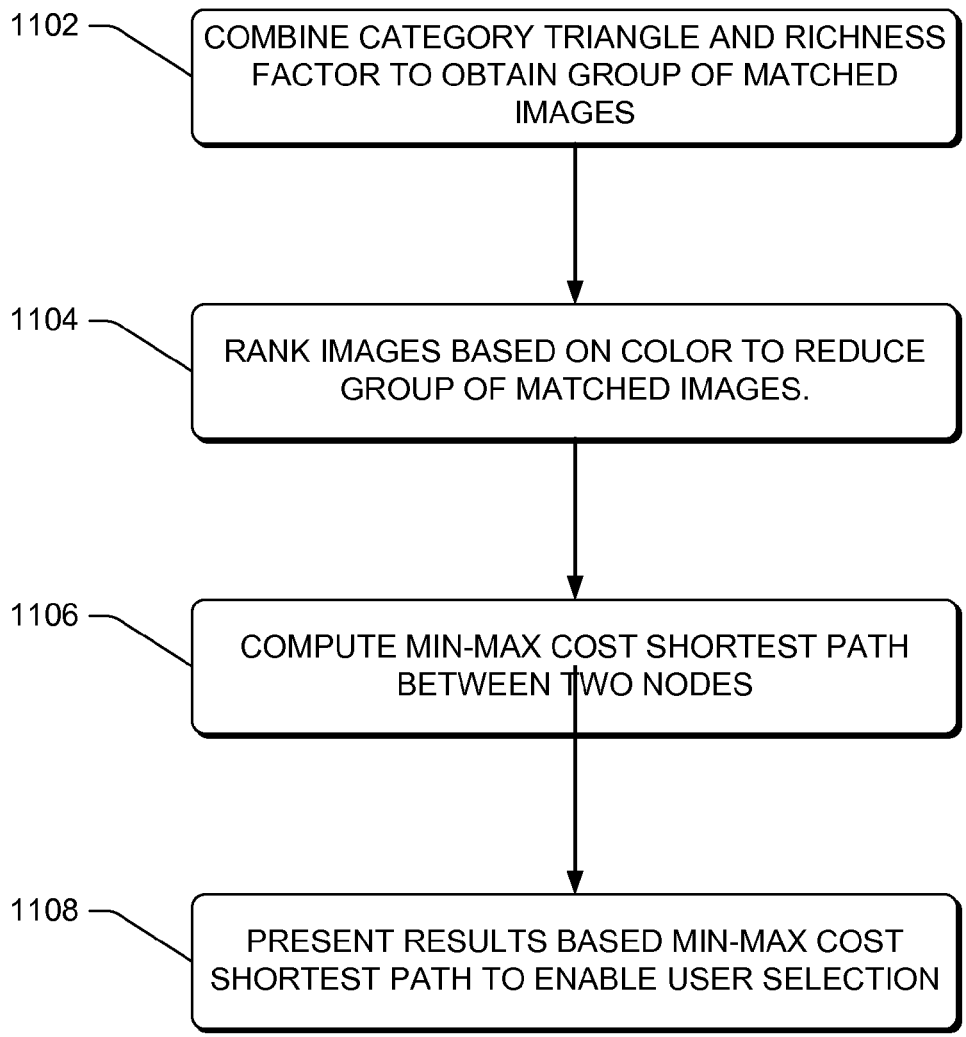
FIG. 11 is a flow diagram of an illustrative process of identifying a chain of similar images in accordance with various embodiments of the disclosure.

FIG. 11 is a flow diagram of an illustrative process 1100 of identifying a path of similar images for a path selection. The user 108 may desire to find a number of sky images that are similar to a selection in a search result (e.g., displayed in the user interface 1000). The search module 136 may identify a number of intermediate images that are "between" two selected images such as to continue a color and attribute spectrum from one image to another image. The search module 136 may organize images from the searchable image SD 122 to present the attribute spectrum via the user interface 1000.

At 1102, the search module 136 may combine the category triangle 1002 and the richness factor determined at the operation 816 to obtain a group of visually similar images. However, other attributes may be selected to create the path.

At 1104, the search module 136 may rank the images identified at the operation 1102 by color to reduce a number of images to a predetermined quantity (e.g., 10, 20, etc.). In some embodiments, the search module 136 may establish an edge between two nodes when the nodes are similar for category, richness, and color attributes. A color similarity (based on EMD distance) may be used as a weight of the edge.

At 1106, the search module 136 may compute a min-max cost for a shortest path between the two nodes to identify a smooth path. For example $p(\epsilon) = \{e_0, e_1, \ldots, e_s, \ldots\}$ may be a shortest path whose max-transition-cost $\max\{e_0, e_1, \ldots, e_s, \ldots\}$ is not greater than a value $\epsilon$, where $e_s$ is an edge weight on the path. The search module 136 may find the shortest path with minimal max-transition-cost according to equation 3:

$$p^* = arg_{p(\epsilon) \in P}{}^{Min}{}_{s \in P(\epsilon)}{}^{Max} e_s \qquad \text{Equ. 3}$$

where $P = \{p(\epsilon) | > 0\}$ contains all shortest paths for various values of $\epsilon$. Because the range of edge weights is limited in this problem, the search module 136 may segment the value $\epsilon$ into various levels (e.g., 16 levels, etc.) within the range [0, 10] and perform a binary search to obtain an approximate solution.

At 1108, the search module 136 may enable presentation of the result of the min-max cots shortest path. For example, the results may be displayed in the search results display section 1024 of the user interface 1000 to enable the user 108 to select an image.

Figure 12:
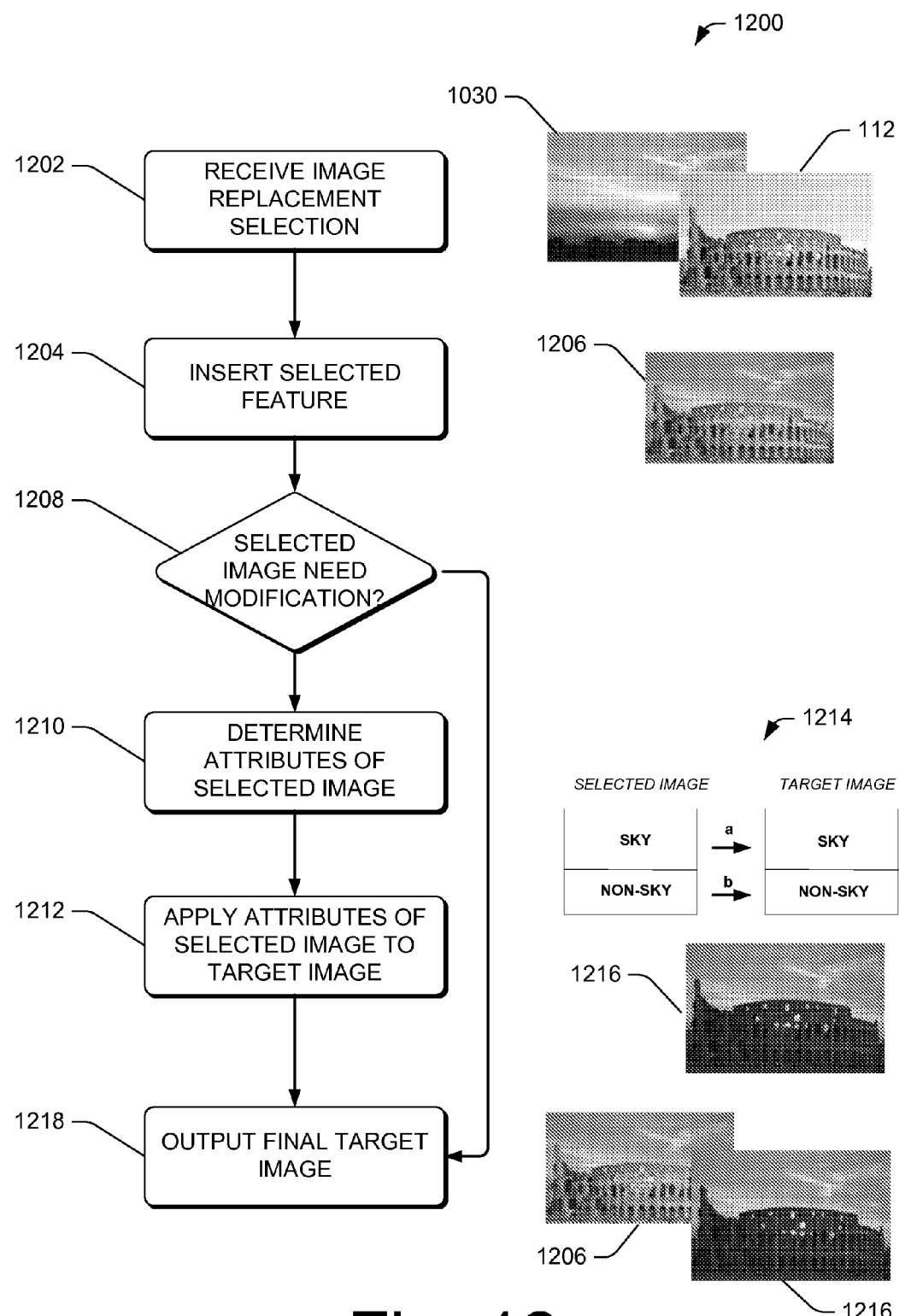
FIG. 12 is a pictorial flow diagram of an illustrative process of image modification by merging aspects of a source image into a target image in accordance with one or more embodiments of the disclosure.

FIG. 12 is a pictorial flow diagram of an illustrative process 1200 of image modification by merging aspects of a source image into a target image in accordance with one or more embodiments of the disclosure. The operations of the process 1200 may be performed by the feature replacement module (FRM) 138 to modify the target image 112.

At 1202, the FRM 138 may receive the selected image 1030 (one of ht source images 110), such as from the user interface 1000. In some embodiments, the FRM 138 may enforce a weak geometric constraint during a user search when the target image 112 is identified before the source image 110 is selected. For example, Q and R may be regions above a horizon in the target image 112 and the source image 110 image. The FRM 138 may include an overlap ratio Q∩R/Q∪R be not less than a predetermine value (e.g., 0.75, etc.).

At 1204, the FRM 138 may insert the selected image 1030 to replace a feature of the target image 112. To replace the feature (e.g., the sky, etc.), the FRM 138 may replace the sky region of the target image 112 with the sky region of the selected image 1030 by aligning their horizons to create a modified image 1206.

At 1208, the FRM 138 may determine whether the target image 112 needs (or would benefit from) a modification (e.g., color modification, darkening, lightening, etc.). When a modification is selected (by a user or the FRM 138), the process 1200 may proceed to 1210. In some embodiments, the modification may be selected at 1208 when the target image 112 is of the blue sky or cloudy sky category.

At 1210, the FRM 138 may determine attributes of the selected image 1030. To obtain visually plausible results, the FRM 138 may adapt a brightness and color of a foreground in the selected image 1030 to the foreground of the target image 112. In some embodiments, the FRM 138 may apply a category-specific color transfer in HSV space.

At 1212, the FRM 138 may compute color transfer variables (shift and variance multiplier) between two sky regions 1214 and then apply the variables to the non-sky region to create a modified foreground image 1216.

At 1218, the final image may be outputted, which may be the modified image 1206 or the modified foreground image 1216. When the retrieved image is within the sunset category, the FRM 138 may directly transfer colors of the source non-sky region in the retrieved image to the target non-sky region at 1218.

Thus, the process 1200 may enable providing a replacement object, such as a sky, into a target image. In addition, the process 1200 may make adjustments to other aspects of the target image (e.g., the foreground) to enhance a perceived realism of the modified target image.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of analyzing an image, the method comprising:
   identifying a selected portion of the image as a focus portion to be categorized within one of a plurality of textual categories;
   generating a score for patches of the image by comparing each patch to a codeword from a codebook, the patches being subdivisions of the image;
   associating a category of the focus portion with the image as one of the plurality of textual categories based on the score;
   determining a layout of the image based on at least one of a size or position of the focus portion of the image; and
   storing the image in a computer readable storage medium, the image stored with metadata that includes the category and layout.

2. The method as recited in claim 1, wherein the focus portion is a sky region of the image.

3. The method as recited in claim 2, wherein the plurality of textual categories include at least a blue sky category, a cloudy sky category, and a sunset category.

4. The method as recited in claim 1, wherein the determining the layout of the image includes determining a horizon by moving a horizontal line upwards from a bottom of the image until a number of focus portion pixels below the horizontal line is greater than a predetermined percent.

5. The method as recited in claim 4, wherein the layout is based on an existence of the horizon and further based upon a percentage of the pixels of the focus portion with respect to a number of pixels in the image when the horizon exists in the image.

6. The method as recited in claim 1, further comprising detecting an existence of a sun in the image and determining a location of the sun when the sun is detected in the image.

7. The method as recited in claim 1, further comprising computing a richness factor for the focus portion based on a number of edges identified in the focus portion.

8. An image analysis system, comprising:
   one or more processors; and
   memory to store computer readable instructions executable by the one or more processors, the instructions operable to:
   identify a focus portion of an image to be categorized within one of a plurality of textual categories;
   segment the image into a plurality of patches, the patches being subdivisions of the image;
   determine a score for each patch of the plurality of patches by comparing each patch to a codeword from a codebook;
   associate a category of the focus portion with the image as one of the plurality of textual categories based on the score;
   determine a layout of the image based at least in part on a percentage of pixels of the focus portion with respect to a number of pixels in the image; and
   store the image in the memory with metadata that includes the category and the layout.

9. The system as recited in claim 8, wherein the focus portion is a sky region of the image.

10. The system as recited in claim 9, wherein the plurality of textual categories include at least a blue sky category, a cloudy sky category, and a sunset category.

11. The system as recited in claim 8, wherein the determining the layout of the image includes determining a horizon by moving a horizontal line upwards from a bottom of the image until a number of focus portion pixels below the horizontal line is greater than a predetermined percent.

12. The system as recited in claim 11, wherein the layout is based on an existence of the horizon and further based upon a percentage of the pixels of the focus portion with respect to the number of pixels in the image when the horizon exists in the image.

13. The system as recited in claim 8, the instructions further operable to detect an existence of a sun in the image and determine a location of the sun when the sun is detected in the image.

14. The system as recited in claim 8, the instructions further operable to compute a richness factor for the focus portion based on a number of edges identified in the focus portion.

15. One or more memory devices storing computer-executable instructions that, when executed, cause one or more processors to perform acts comprising:
   identifying a focus portion of an image to be categorized within one of a plurality of textual categories;
   segmenting the image into a plurality of patches, the patches being subdivisions of the image;

determining a score for each patch of the plurality of patches by comparing each patch to a codeword from a codebook;

associating a category of the focus portion with the image as one of the plurality of textual categories based on the score;

determining a layout of the image based at least in part on a percentage of pixels of the focus portion with respect to a number of pixels in the image; and storing the image in the one or more memory devices with metadata that includes the category and the layout.

16. The one or more memory devices as recited in claim 15, wherein the focus portion is a sky region of the image.

17. The one or more memory devices as recited in claim 16, wherein the plurality of textual categories include at least a blue sky category, a cloudy sky category, and a sunset category.

18. The one or more memory devices as recited in claim 15, wherein the determining the layout of the image includes determining a horizon by moving a horizontal line upwards from a bottom of the image until a number of focus portion pixels below the horizontal line is greater than a predetermined percent.

19. The one or more memory devices as recited in claim 18, wherein the layout is based on an existence of the horizon and further based upon a percentage of the pixels of the focus portion with respect to the number of pixels in the image when the horizon exists in the image.

20. The one or more memory devices as recited in claim 15, the acts further comprising detecting an existence of a sun in the image and determining a location of the sun when the sun is detected in the image.

\* \* \* \* \*